(12) United States Patent
Moggridge et al.

(10) Patent No.: US 10,412,286 B2
(45) Date of Patent: Sep. 10, 2019

(54) MULTICAMERA IMAGING SYSTEM AND METHOD FOR MEASURING ILLUMINATION

(71) Applicant: Westboro Photonics Inc., Ottawa (CA)

(72) Inventors: Timothy Moggridge, Ottawa (CA); Chad Greene, Ottawa (CA)

(*) Notice: Subject to any disclaimer, the term of this patent is extended or adjusted under 35 U.S.C. 154(b) by 0 days.

(21) Appl. No.: 15/942,487

(22) Filed: Mar. 31, 2018

(65) Prior Publication Data
US 2018/0288292 A1 Oct. 4, 2018

Related U.S. Application Data

(60) Provisional application No. 62/479,636, filed on Mar. 31, 2017.

(51) Int. Cl.

| | |
|---|---|
| H04N 5/225 | (2006.01) |
| G01J 3/02 | (2006.01) |
| G02B 7/09 | (2006.01) |
| H04N 5/235 | (2006.01) |
| G02B 7/28 | (2006.01) |
| H04N 5/232 | (2006.01) |
| H04N 9/09 | (2006.01) |
| H04N 9/64 | (2006.01) |

(52) U.S. Cl.
CPC .......... *H04N 5/2254* (2013.01); *G01J 3/0205* (2013.01); *G02B 7/09* (2013.01); *G02B 7/28* (2013.01); *H04N 5/2253* (2013.01); *H04N 5/2258* (2013.01); *H04N 5/2353* (2013.01); *H04N 5/23232* (2013.01); *H04N 9/09* (2013.01); *H04N 9/64* (2013.01)

(58) Field of Classification Search
None
See application file for complete search history.

(56) References Cited

U.S. PATENT DOCUMENTS

| | | | |
|---|---|---|---|
| 751,347 A | 2/1904 | Scheimpflug | |
| 5,068,749 A | 11/1991 | Patel | |
| 6,002,423 A * | 12/1999 | Rappaport | G01S 7/4811 348/162 |

(Continued)

FOREIGN PATENT DOCUMENTS

WO 2016033967 3/2016

OTHER PUBLICATIONS

Shree K. Nayar, Computational Cameras, Conference on Machine Vision Applications, May 16-18, 2007, p. 158-166, Tokyo, Japan.

(Continued)

*Primary Examiner* — Shawn Decenzo

(57) ABSTRACT

A multicamera imaging system includes multiple imaging subsystems. Each subsystem includes imaging optics, an optical filter, an optional shutter, a digital imaging sensor, and an analog-to-digital converter. After optional scaling, image displacement, keystone and other corrections, the captured images are aligned to result in a multi-layer registered image. Illumination metrics of individual pixels of the registered image are then calculated. The spatial distribution of the optical illumination properties of planar objects are measured, including colorimetric, photometric, radiometric, and spectroradiometric characterization and calibration of digital image displays and radiant scenes.

25 Claims, 9 Drawing Sheets

(56) References Cited

U.S. PATENT DOCUMENTS

| | | | |
|---|---|---|---|
| 6,445,884 B1* | 9/2002 | Yahav | B60Q 9/008 396/106 |
| 7,936,392 B2 | 5/2011 | Ng et al. | |
| 8,462,420 B2 | 6/2013 | Lee et al. | |
| 8,482,652 B2 | 7/2013 | Kreysar et al. | |
| 9,191,587 B2 | 11/2015 | Wright et al. | |
| 9,485,417 B2 | 11/2016 | Campbell et al. | |
| 9,497,380 B1* | 11/2016 | Jannard | H04N 5/23238 |
| 9,565,419 B2* | 2/2017 | Presler | H04N 5/225 |
| 2002/0001080 A1* | 1/2002 | Miller | G01J 1/08 356/326 |
| 2003/0108223 A1 | 6/2003 | Prokoski | |
| 2003/0147002 A1* | 8/2003 | Ray | G01S 17/89 348/370 |
| 2007/0057164 A1* | 3/2007 | Vaughnn | G03F 7/7085 250/216 |
| 2007/0296835 A1* | 12/2007 | Olsen | H04N 5/3415 348/234 |
| 2010/0111489 A1* | 5/2010 | Presler | H04N 5/225 386/278 |
| 2010/0188418 A1* | 7/2010 | Sakai | G01J 1/4204 345/594 |
| 2010/0231690 A1* | 9/2010 | Fujieda | G06K 9/00214 348/47 |
| 2011/0026027 A1* | 2/2011 | Edge | G01J 3/46 356/405 |
| 2011/0026052 A1* | 2/2011 | Edge | G01J 3/46 358/1.9 |
| 2011/0080487 A1* | 4/2011 | Venkataraman | H04N 5/2253 348/218.1 |
| 2011/0176029 A1* | 7/2011 | Boydston | G01J 3/50 348/223.1 |
| 2013/0063614 A1* | 3/2013 | Tsutsumi | H04N 5/2258 348/208.4 |
| 2014/0300753 A1* | 10/2014 | Yin | G01J 3/50 348/187 |
| 2015/0124002 A1* | 5/2015 | Horikawa | G09G 3/3607 345/690 |
| 2016/0180499 A1 | 6/2016 | Lindskog | |
| 2016/0261839 A1* | 9/2016 | Holub | G01J 3/02 |
| 2016/0307485 A1* | 10/2016 | Ma | G09G 3/20 |
| 2017/0069291 A1* | 3/2017 | Holub | G06F 3/14 |
| 2018/0218656 A1* | 8/2018 | Richards | G09G 3/006 |

OTHER PUBLICATIONS

Leonard Evens, Depth of Field for the Tilted Lens Plane, 2008, p. 1-20.

Paul Heckbert, Projective Mappings for Image Warping, University of California Berkeley Computer Science Technical Report 15-869, Sep. 13, 1999, p. 1-5.

\* cited by examiner

MULTICAMERA IMAGING SYSTEM AND METHOD FOR MEASURING ILLUMINATION

TECHNICAL FIELD

The subject matter of the present invention relates to digital imaging. In particular, it relates to the colorimetric, photometric, radiometric, and spectroradiometric characterization and calibration of radiant scenes.

BACKGROUND

Imaging colorimeters are used to profile and calibrate the colorimetric performance of digital output devices, such as for example LCD (liquid crystal display) display panels, LED (light emitting diode) displays, and illuminated instrument clusters and keypads.

In a first prior art device shown in FIG. 1, such as for example the Cognex In-Sight 5705C from Natick, Mass., USA, a digital imaging sensor 100 is comprised of, for example, a CCD (charge-coupled device) or CMOS (complementary metal-oxide semiconductor) sensor, and a rectangular array of red 120, green 130, and blue 140 color microfilters, which are bonded directly to sensor photosensitive cells (pixels or "pels") 115. White light 110 incident upon the microfilters 120, 130, and 140 is filtered into red 125, green 135, and blue 145 light respectively. The color microfilters are arranged in a repeating "Bayer mosaic" pattern on the array's pels as represented by arrangements 150 (red), 160 (green), and 170 (blue). Advantages of this approach are low cost sensors and the lack of moving parts.

Unfortunately, this approach also has several disadvantages. First, the choice of spectral transmittance distributions of the red, green, and blue microfilters is severely limited by the availability of organic dyes that are compatible with the photoresist materials techniques required to fabricate the array. Second, the Bayer filter mosaic limits the color image resolution to 50% of the sensor resolution for green images, and 25% for red and blue images. Third, the interline CCD imaging sensors typically used for commercial imaging colorimeters have relatively small pels, which may limit the detector dynamic range and signal-to-noise ratio. Fourth, the pixels may not have identical spectral responsivity if the method for printing the filters is not highly reproducible.

In a second prior art embodiment shown in FIG. 2, such as for example the Prometric IC-PM from Radiant Vision Systems, Redmond, Wash., the imaging colorimeter 200 is comprised of an arrangement of imaging lenses 210, three or more color filters 220, 221, 222 mounted on a first mechanically rotatable disk 225, one or more neutral density filters 230, 231 mounted on a second mechanically rotatable disk 235, a mechanical or electro-optic shutter 240, and a digital image sensor 250. The lenses 210, selected color filter 221, selected neutral density filter 231, shutter 240 and image sensor 250 are aligned on a common optical axis 260.

In operation, a neutral density filter 231 (or none 232) is rotated into position, following which one of the color filters 221 is rotated into position prior to opening shutter 240 and capturing a digital image with image sensor 250. Each image is processed by an analog-to-digital converter and associated electronics module 270 and transmitted to a computer 280 for further processing or data storage.

An advantage of this approach is that individual red, green, and blue filters can be fabricated such that the combinations of their spectral transmittance distributions and the spectral responsivity distribution of the imaging sensor pels closely match the CIE color matching functions. A second advantage is that filters with different spectral transmittance distributions, including but not limited to narrowband, infrared, ultraviolet, and polarization filters, may be utilized for multiband spectral imaging applications. A third advantage is that the filtering method may provide a more uniform spectral responsivity than printed Bayer filters.

Unfortunately, this approach also has disadvantages. First, the need to physically rotate the color filter wheel necessarily limits the device throughput. The Prometric IC-PM colorimeters, for example, may have long measurement times due to resolution-dependent image sensor read-out time and filter wheel rotation speed. This can be a disadvantage for production line testing, as it may represent a bottleneck in the production flow.

A second disadvantage is that the rotating filter wheel introduces moving parts that are subject to vibration, wear, and possible failure, while a third disadvantage is that the spectral range is limited to that of the spectral responsivity distribution of the imaging sensor, for example as shown in FIG. 3. This eliminates the possibility of, for example, multiband spectral imaging involving both ultraviolet and infrared radiation bands.

SUMMARY OF INVENTION

A multicamera imaging (MI) system includes at least two cameras or imaging subsystems, each subsystem including imaging optics, a color filter and a digital imaging sensor. Images produced by the cameras are corrected for distortion, aligned, and then registered with each other to within a few pixels. Each pixel of the registered image is then analyzed individually.

A multicamera imaging photometer includes two or more cameras, each including imaging optics, an optical filter, an optional shutter, and a digital imaging sensor. A two camera MI photometer is used, for example, to quantify the luminance distribution of a virtual reality headset.

An MI colorimeter includes at least three imaging subsystems, each subsystem including imaging optics, a color filter and a digital imaging sensor. The spectral responsivity of the imaging sensors is modified by the color filters such that digital images are captured with different wideband spectral responses that approximate CIE color matching functions $\bar{x}$, $\bar{y}$, and $\bar{z}$. Various color metrics, such as for example CIE 1931 tristimulus coordinates X, Y, and Z, CIE 1931 chromaticity coordinates x and y, CIE luminance Y, CIE 1976 uniform color space coordinates u' and v', and correlated color temperature, are then calculated on a per-pixel basis.

An MI colorimeter is used to profile and calibrate the colorimetric performance of a radiant scene, including the steps of: capturing one or more pixelated digital images of a radiant target; aligning and registering captured images to create a multi-layer registered image; and calculation of color metrics on a per-pixel basis. A radiant scene includes a point or object from which light radiates, of which a luminous scene is a subset. In addition, a radiant scene may include a flat surface, for example an LED or LCD display. A radiant scene may include one or more locations, positions, or points, from which light radiates.

Embodiments of the MI system of the present invention address one or more of the prior art disadvantages by employing a plurality of digital imaging subsystems, each comprised of a digital imaging sensor, an optical filter, and associated imaging optics. Such digital imaging subsystems may include coaxial digital imaging subsystems. Specifically, each digital imaging subsystem is compatible with the full range of available individual spectral bandpass and polarization filters; they utilize the full resolution of the plurality of imaging sensors; and they can utilize imaging sensors with different technologies and hence different spectral responsivity distributions. In embodiments with no moving parts, throughput is limited only by the time needed to capture and output a single digital image.

A key feature of the invention is a method of aligning and registering captured images such that there is alignment of the one or more captured images, thereby enabling the calculation of color metrics and other mathematical operations on a per-pixel basis.

Disclosed herein is a multicamera imaging system comprising multiple imaging subsystems, each imaging subsystem comprising: imaging optics aligned on an optical axis; an optical filter aligned on the optical axis; an optional shutter aligned on the optical axis; a digital imaging sensor aligned to capture an image produced by the imaging optics and the optical filter; and an analog-to-digital converter connected to an output of the digital imaging sensor. The multicamera imaging system also comprises a computer connected to each of the analog-to-digital converters, wherein the computer is configured to: align the images captured by the digital imaging sensors so that corresponding pixels of the images overlap, to result in a multi-layer registered image; and calculate illumination metrics of individual pixels of the multi-layer registered image.

Also disclosed herein is a method to calculate illumination metrics of a radiant scene, comprising the steps of: simultaneously capturing overlapping digital images of the radiant scene using multiple imaging subsystems of a multicamera imaging system, each imaging subsystem comprising imaging optics aligned on an optical axis, an optical filter aligned on the optical axis, an optional shutter aligned on the optical axis, a digital imaging sensor aligned to capture an image produced by the imaging optics and the optical filter, and an analog-to-digital converter connected to an output of the digital imaging sensor; aligning, by a computer connected to the analog-to-digital converters, the digital images so that corresponding pixels of the images overlap to result in a multi-layer registered image; and calculating, by the computer, illumination metrics of individual pixels of the multi-layer registered image.

BRIEF DESCRIPTION OF DRAWINGS

The following drawings, which are not necessarily to proportion, illustrate embodiments of the invention and should not be construed as restricting the scope of the invention in any way.

DETAILED DESCRIPTION

A. Glossary

The CIE (International Commission on Illumination) is responsible for various specifications for representing color and defining the color sensitivity of the average human observer.

The term "colorimetry" refers to the measurement of brightness and color as perceived by humans.

The term "pel" refers to a photosensitive cell of a sensor.

The term "photometry" refers to the measurement of the brightness of visible light as perceived by humans.

The term "radiometry" refers to the measurement of the power emitted by a source of electromagnetic radiation.

The term "spectroradiometry" refers to the measurement of the spectral power distribution of a light-emitting source.

The term "subpixel" refers to one of the individual components that make up a pixel. For example, a display screen pixel may be made up of a green, a red and a blue subpixel. It also refers to a dimension that is less than a pixel.

The term "tilted object plane" refers to an object plane that is not perpendicular to the axis of a camera that is capturing an image of the object.

B. Embodiments

Figure 1:
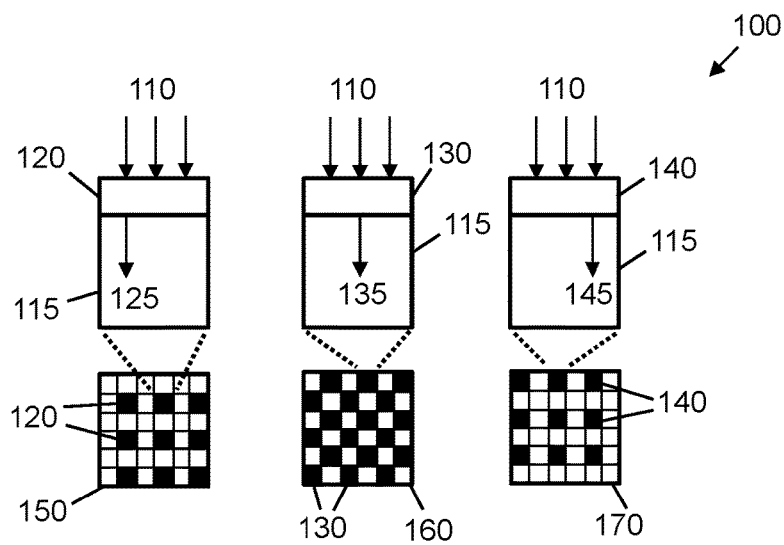
FIG. 1 is a schematic drawing of a prior art Bayer mosaic color microfilter pattern for red-green-blue digital imaging sensors.
Figure 2:
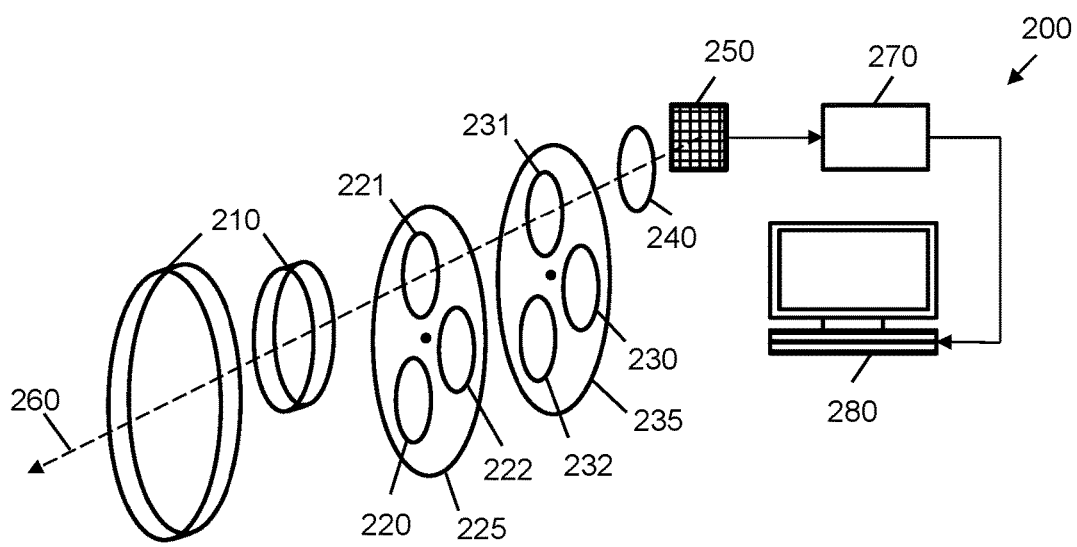
FIG. 2 is a schematic drawing of a prior art imaging colorimeter with a moveable color filter wheel.
Figure 3:
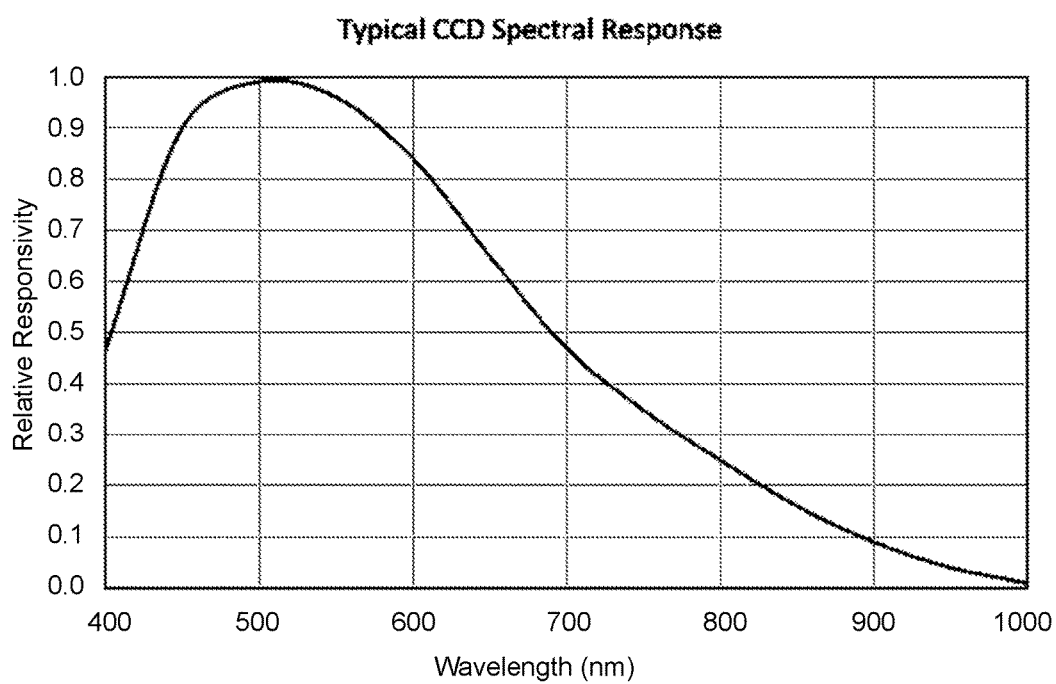
FIG. 3 illustrates the spectral responsivity distribution of a typical, prior art CCD imaging sensor.
Figure 4:
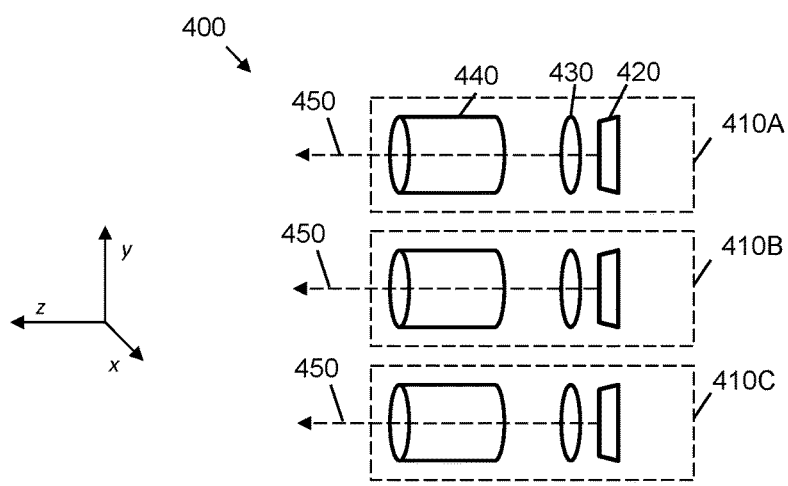
FIG. 4 is a schematic drawing of an embodiment of the invention wherein the imaging subsystems of an MI colorimeter are aligned with their axes parallel to the z-axis.

In a first embodiment of the invention shown in FIG. 4, an MI colorimeter 400 includes a plurality of digital imaging subsystems 410A-C aligned on axes 450 that are parallel with each other. Each digital imaging subsystem 410A-C includes a digital imaging sensor 420, a fixed optical filter 430, and an imaging optics module 440 with optical axis 450. Sensors 420 and filters 430 are in planes parallel to the x-y plane, and the axes 450 of imaging optics modules 440 are aligned parallel to the z-axis.

Each digital imaging subsystem 410A-C has a different spectral responsivity distribution as determined by the combination of the spectral transmittance of the imaging optics module 440, the spectral transmittance distribution of the optical filter 430, and the spectral responsivity distribution of the imaging sensor 420.

The optical filter 430 may be an inorganic glass filter, an organic polymer filter, a thin film filter, a combination thereof, or any other transparent material with a desired spectral transmittance distribution.

The spectral transmittance distribution of the optical filter 430 may be fixed, or it may be electrically tunable, as disclosed in, for example, U.S. Pat. No. 5,068,749 and U.S. Pat. No. 8,462,420.

The optical filter 430 may further incorporate a linear or circular polarizer.

In some embodiments, the imaging sensor 420 may be offset in the x-y plane with respect to the imaging optics axis 450.

The resolution, size, and type of imaging sensor 420 may be different for each imaging subsystem 410A-C. For instance, a sensor with a spectral range in the mid-infrared may have a lower resolution than a sensor with a spectral range in the visible region of the spectrum. Similarly the optics module 440 may be different for each imaging subsystem 410A-C. Additionally, image sensor binning strategies may also result in different effective resolutions for each image sensor 420, and specific region sampling strategies may result in different effective sizes for each image sensor 420. For example a binning strategy may include binning 2×2, 3×3, 4×4 . . . n×n pixels, where every n×n pixels within an image are summed, or potentially averaged, thus creating a new image with a new resolution given by Equation 1.

$$\text{new resolution} = \text{original resolution}/(n \times n) \quad \text{(Eq. 1)}$$

Figure 5:
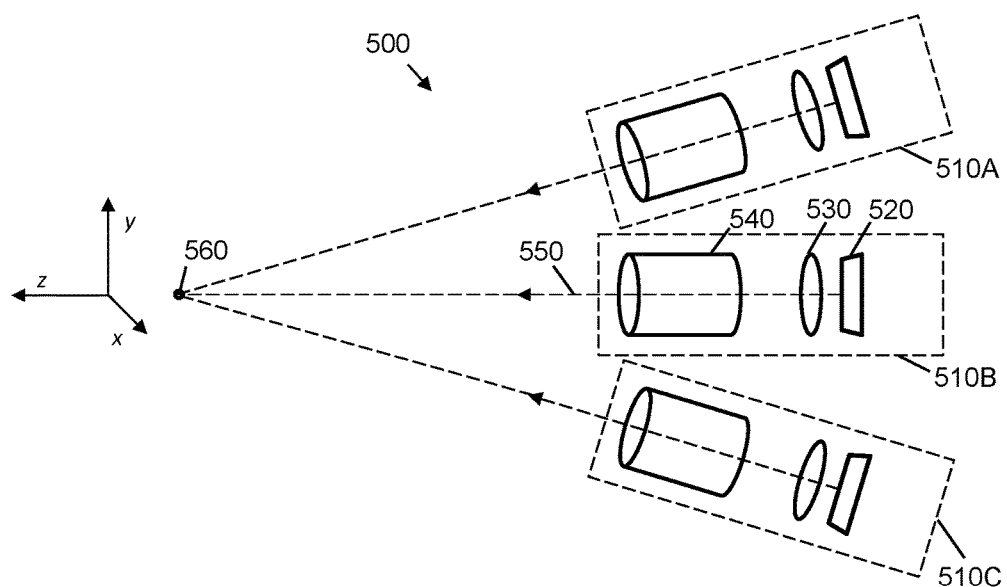
FIG. 5 is a schematic drawing of an embodiment of the invention wherein the optical axes of the imaging subsystems of an MI colorimeter intersect at a common point on the z-axis.

In a second embodiment shown in FIG. 5, the invention is an MI colorimeter 500 that is comprised of a plurality of digital imaging subsystems 510A-C, wherein each digital imaging subsystem is comprised of a digital imaging sensor 520, a fixed optical filter 530, and imaging optics module 540 with optical axis 550. Axes 550 of the imaging subsystems 510A-C are aligned such that they intersect at a common point of focus 560 on the z-axis.

Figure 6:
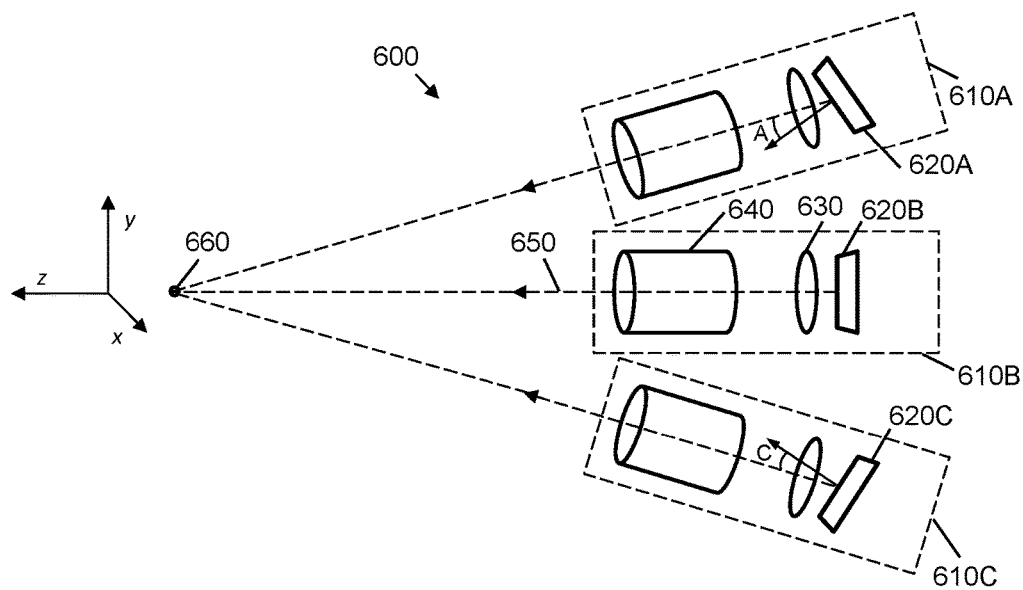
FIG. 6 is a schematic drawing of an embodiment of the invention wherein two of the imaging sensors of an MI colorimeter are tilted with respect to the optical axis rather than perpendicular to the optical axis.

In a third embodiment shown in FIG. 6, the invention is an MI colorimeter 600 that is comprised of a plurality of digital imaging subsystems 610A-C, wherein each digital imaging subsystem is comprised of a digital imaging sensor 620A-C, a fixed optical filter 630, and imaging optics module 640 with optical axis 650. Optical axes 650 of the imaging subsystems 610A-C are aligned such that they intersect at a common point 660 on the z-axis. Critically, imaging sensors 620A, 620C are tilted relative to the optical axis 650 rather than perpendicular to it. Imaging sensor 620A is tilted at an angle A to its corresponding optical axis 650, whereas imaging sensor 620C is tilted at an angle C to its corresponding optical axis. Digital imaging subsystems 610A, 610C are therefore optically equivalent to a photographic view camera with a tilted lens plane. Imaging sensor 620B is perpendicular to its corresponding optical axis 650, because it is parallel to the object plane when the corresponding digital imaging subsystem 610B is aligned with its optical axis perpendicular to the object plane. As will be familiar to those skilled in the art, tilting the lens plane with respect to the sensor plane results in the object plane being similarly tilted in accordance with the Scheimpflug condition.

Figure 7:
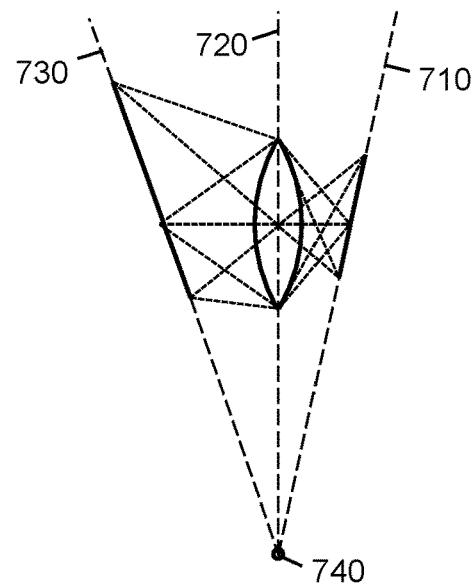
FIG. 7 illustrates the geometry of the Scheimpflug condition.

As shown in FIG. 7, the Scheimpflug condition is satisfied when the sensor plane 710, the lens plane 720 and the object plane 730 intersect along a common axis 740. When this condition is satisfied, all points on the object plane 730 are in optimal focus on the sensor plane 710, as disclosed in U.S. Pat. No. 751,347. This confers an advantage on the third embodiment in that the object plane 730 can be the same for each imaging subsystem 610, thereby avoiding potential depth-of-field problems with high-resolution digital imaging sensors 620 under low-light level conditions.

Figure 8:
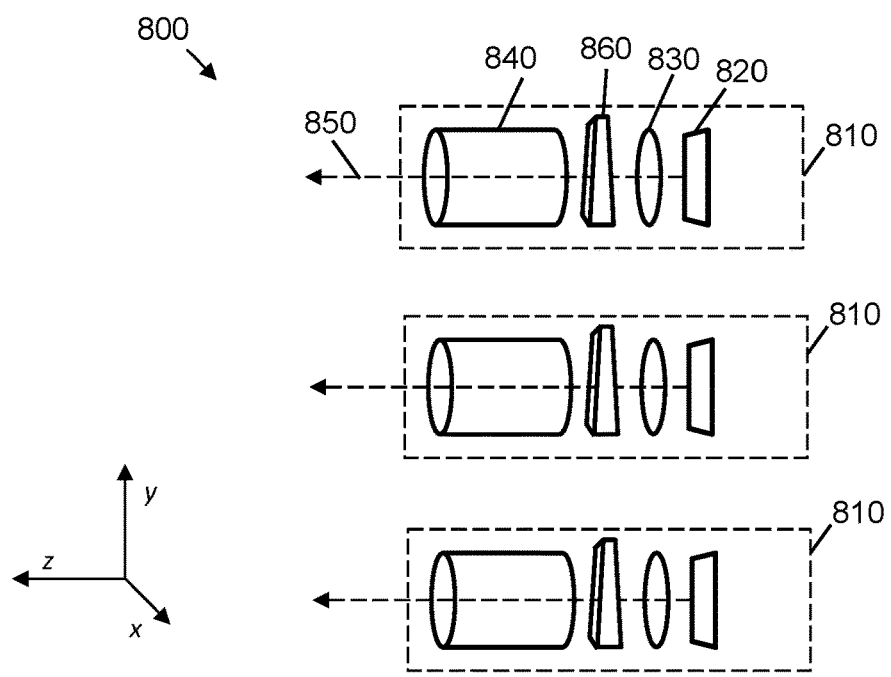
FIG. 8 is a schematic drawing of an embodiment of the invention wherein the imaging subsystems of an MI colorimeter are aligned with their axes parallel to the z-axis and provided with corrector plates.

In a fourth embodiment shown in FIG. 8, the invention is an MI colorimeter 800 that is comprised of a plurality of digital imaging subsystems 810, wherein each subsystem is comprised of a digital imaging sensor 820, a fixed optical filter 830, and imaging optics module 840 with optical axis 850. Sensors 820 and filters 830 are in planes parallel to the x-y plane, and the imaging optics modules 840 are aligned with their axes 850 parallel to the z-axis. Interposed between the imaging optics module 840 and fixed optical filter 830 is an optically transparent corrector plate 860. Alternatively the corrector plate 860 could instead be interposed between each sensor 820 and filter 830. The corrector plates are similar, and are arranged similarly in each digital imaging subsystem 810 so that a similar correction is applied to the image in each digital imaging subsystem. This is so that the MI colorimeter 800 can focus on an object in a plane that is not perpendicular to the optical axes 850.

Figure 9:
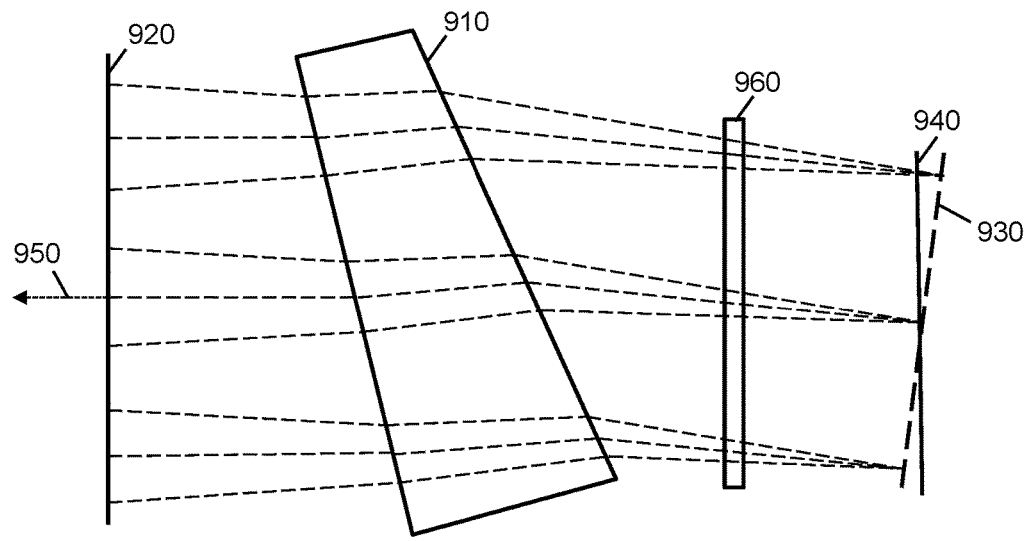
FIG. 9 illustrates an optical corrector plate that satisfies the Scheimpflug condition.

As shown in FIG. 9, optical corrector plate 910 is comprised of a transparent material that forms a prism, as disclosed in US Patent Application 2007/0057164, in which the prism is referred to as a "Scheimpflug normalizer". The transparent material is preferably a low-dispersion glass with a high refractive index. Refraction of incident light from the imaging optics module 920 results in the image plane 930 being tilted, even though the optical axis 950 is perpendicular to the sensor plane 940. An object that is suitably tilted relative to the sensor plane 940 forms an image that is in the sensor plane, because of the deviation in the light path introduced by the corrector plate 910.

Optical corrector plate 910 may be separate from optical filter 960, or it may be combined into a combination filter and corrector plate. Depending on the dispersion characteristics of the transparent material, it may be necessary to limit the spectral bandwidth of the optical filter to avoid spectral smearing of the image on the sensor plane.

Figure 10:
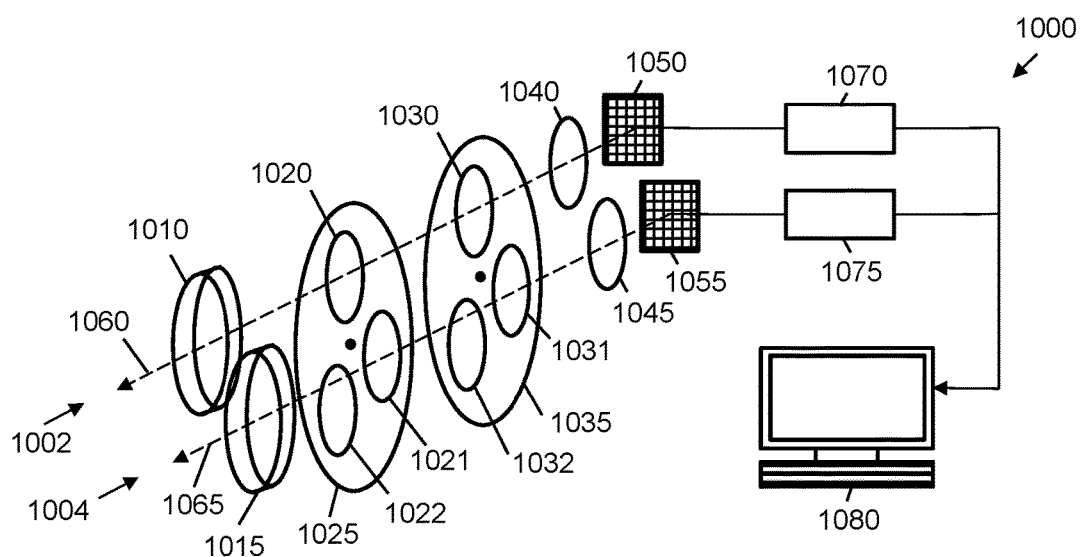
FIG. 10 is a schematic drawing of an embodiment of the invention with a color filter wheel shared between two or more imaging subsystems of an MI colorimeter.

In a fifth embodiment shown in FIG. 10, the MI colorimeter 1000 is comprised of two arrangements 1002, 1004 of optical components, of which some are common to the two imaging arrangements. The first arrangement 1002 includes one or more imaging lenses 1010, three or more color filters 1020, 1021, 1022 mounted on a first mechanically rotatable disk 1025, one or more neutral density filters 1030, 1031 (or clear 1032) mounted on a second mechanically rotatable disk 1035, a mechanical or electro-optic shutter 1040, and a digital image sensor 1050. The imaging lenses 1010, the color filter 1020, the neutral density filter 1030, the shutter 1040 and digital image sensor 1050 are aligned on a common optical axis 1060. The second arrangement 1004 includes one or more imaging lenses 1015, the three or more color filters 1020, 1021, 1022 mounted on the first mechanically rotatable disk 1025, the one or more neutral density filters 1030, 1031 (or clear 1032) mounted on the second mechanically rotatable disk 1035, a mechanical or electro-optic shutter 1045, and a digital image sensor 1055. The imaging lenses 1015, the color filter 1021, the neutral density filter 1031, the shutter 1045 and digital image sensor 1055 are aligned on a common optical axis 1065.

In one embodiment, optical axes 1060, 1065 are parallel. In another embodiment, the optical axes 1060, 1065 are not parallel and the fields of view of imaging systems 1002, 1004 overlap at some distant focal point. In this latter case, the filters 1020, 1021, 1022, 1030, 1031 (and clear 1032) are mounted at a corresponding angle on the rotatable disks 1025, 1035. As may be readily understood, three or more imaging subsystems may be similarly arranged with common rotatable wheels 1025 and 1035. As may also be readily understood, color filters 1020, 1021, 1022 and neutral density filters 1030, 1031 (or clear 1032) rotated into position by rotatable disks may also be positioned along common optical axes 1060 and 1065 via alternative positioning mechanics such as one or more linear translation stages.

In operation, neutral density filters 1030, 1031 (or clear 1032) are rotated into position, following which the color filters 1020, 1021, 1022 are rotated into position prior to opening shutters 1040 and 1045 and simultaneously capturing two digital images with image sensors 1050 and 1055. The captured images are processed by analog-to-digital converter and associated electronics modules 1070 and 1075 respectively, then transmitted to a computer system 1080 for further processing or data storage. The computer system comprises one or more processors connected to non-transient computer readable memory in which is stored computer readable data and computer executable instructions. The computer readable instructions are executed by the processor to perform the necessary processing of the captured images and to store and retrieve the data.

An advantage of this embodiment is that color filters 1020, 1021, 1022 can be shared between multiple imaging arrangements 1002, 1004. Color filters for precision colorimetric applications are often more expensive than imaging lenses and sensors. By sharing the color filters 1020, 1021, 1022 between the multiple imaging arrangements 1002, 1004, the cost of the colorimeter 1000 is thereby reduced compared to using a complete set of color filters for each imaging arrangement. Furthermore the overall size of a colorimeter with integrated imaging subsystems using shared filters can be more compact compared to colorimeters with separate imaging subsystems, each having their own rotating disk assemblies.

Figure 11:
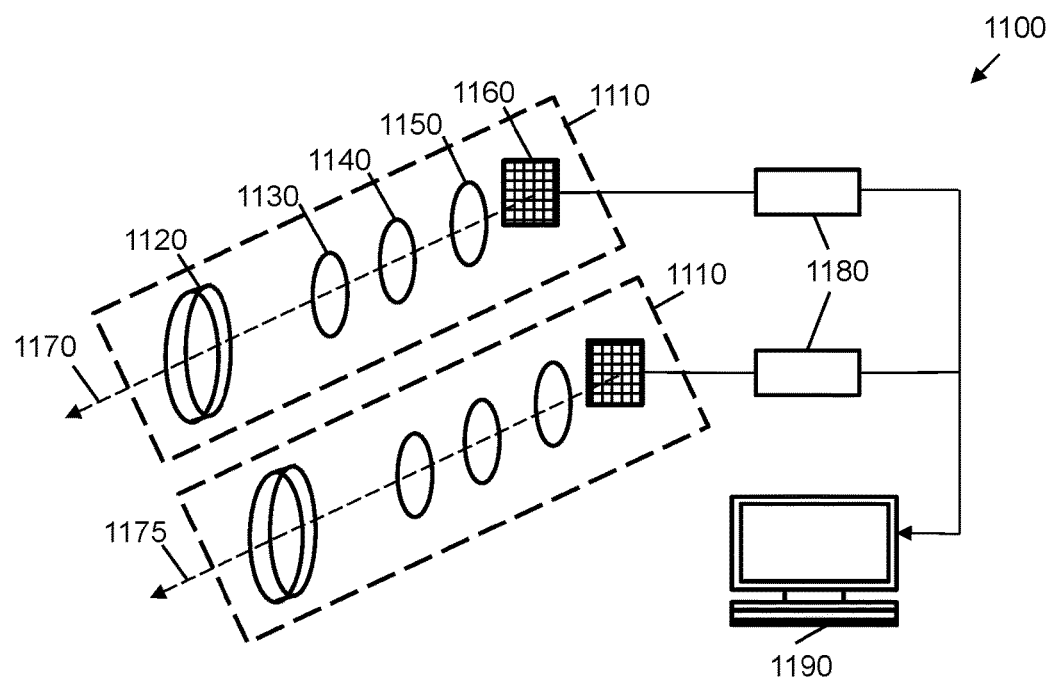
FIG. 11 is a schematic drawing of an embodiment of the invention for characterizing and calibrating stereo visual displays.

In a sixth embodiment shown in FIG. 11, a multicamera imaging system 1100 is comprised of two identical imaging subsystems 1110 each comprised of lens arrangement 1120, color filter 1130, optional neutral density filter 1140, shutter 1150, and imaging sensor 1160 aligned on an optical axis 1170 or 1175. The optical axes 1170, 1175 are parallel to each other. Each subsystem 1110 is connected to an analog-to-digital converter and associated electronics modules 1180, which in turn are all commonly connected to a computer system 1190 for further processing of the captured images and/or data storage.

In one useful configuration, two identical imaging subsystems 1110 are spaced apart with their optical axes 1170, 1175 at a distance equal to that of the average human interocular distance (63 mm) to form an MI photometer. Other human interocular distances are possible in other embodiments. The combination of the spectral transmittance of color filter 1130 and the spectral responsivity of imaging sensor 1160 is approximately equal to that of the CIE 1931 luminous responsivity function $V(\lambda)$, thereby enabling the embodiment to quantify the luminance distribution of, for example, virtual reality and head-up stereo displays. By "approximately equal", we mean an $f_1'$ error less than 10%.

As may be readily understood, three or more imaging subsystems 1110 may be arranged to form an MI colorimeter 1100. In this embodiment, the digital imaging subsystems 1110 are not identical because they have different color filters 1130.

Figure 12:
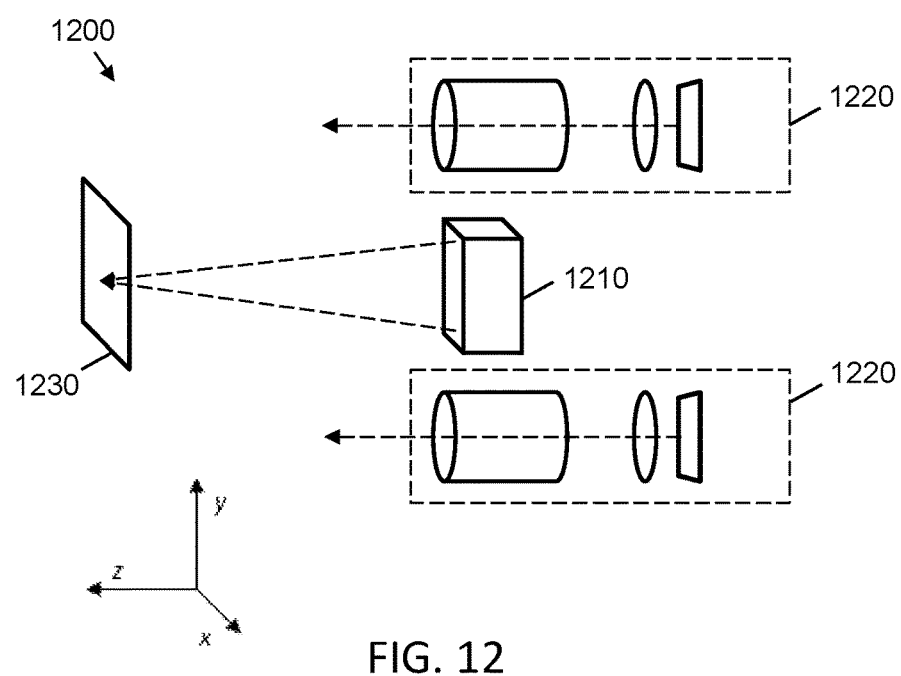
FIG. 12 is a schematic drawing of an MI colorimeter with a range finder, according to an embodiment of the present invention.

In FIG. 12, the multicamera imaging colorimeter 1200 may include a laser range finder, an acoustic range finder, or a similar range finding device 1210 mounted with its axis parallel to the z-axis. Each imaging subsystem 1220 is equipped with autofocus capabilities, and receives information from the range finding device 1210 to focus on an object plane 1230 at a distance indicated by the range finding device, wherein the object plane is assumed to be parallel to the x-y plane.

Each imaging subsystem 1220 may further comprise a plenoptic (a.k.a. "light field") imaging subsystem such as that disclosed in U.S. Pat. No. 7,936,392, wherein the depth of field and target plane can be determined a posteriori using computational photography techniques, thereby obviating the need for autofocus capabilities.

Figure 13:
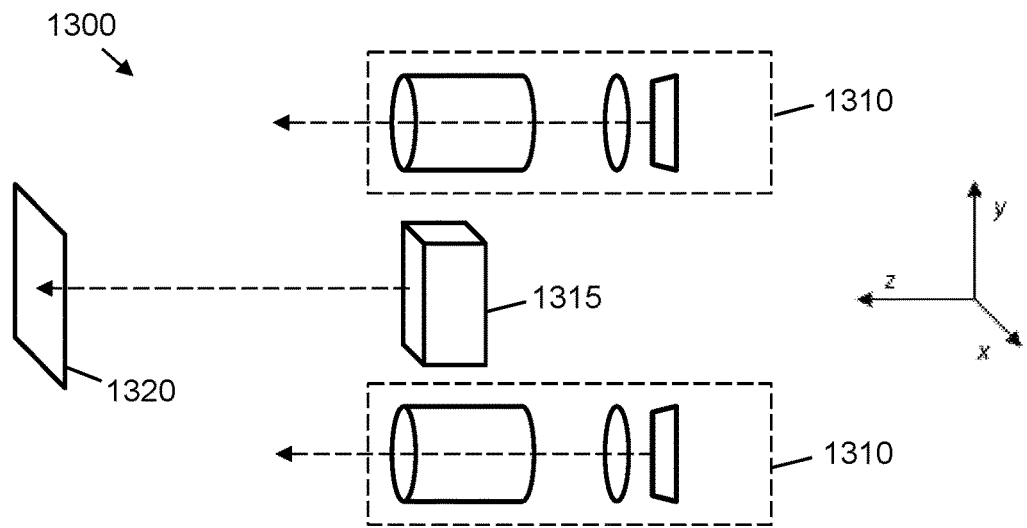
FIG. 13 is a schematic drawing of an MI colorimeter with a spectroradiometer, according to an embodiment of the present invention.

In FIG. 13, the multicamera imaging colorimeter 1300, with multiple imaging subsystems 1310, includes a spectroradiometer 1315 mounted with its axis parallel to the z-axis. The spectroradiometer may be used to improve the measurement accuracy of each imaging subsystem 1310 via comparison of a commonly measured area of the target display 1320 and measure metrics such as the display white point correlated color temperature, the color gamut chromaticities, and display luminance. The spectroradiometer 1315 can be provided with its own optical components (not shown) that are focused on the target object, or it can be optically connected to an optical train of the imaging system 1300 by means of a moveable mirror, a beamsplitter mirror, or an optical pellicle. In some embodiments the spectroradiometer is not mounted coaxially with the z-axis.

In another embodiment, an optical flicker sensor (not shown) can be mounted parallel to the z-axis. In some embodiments the optical flicker sensor is included, but not mounted parallel to the z-axis. The optical flicker sensor may be used to determine an optimal set of exposure times to be used by the imaging subsystems 1310.

Figure 14:
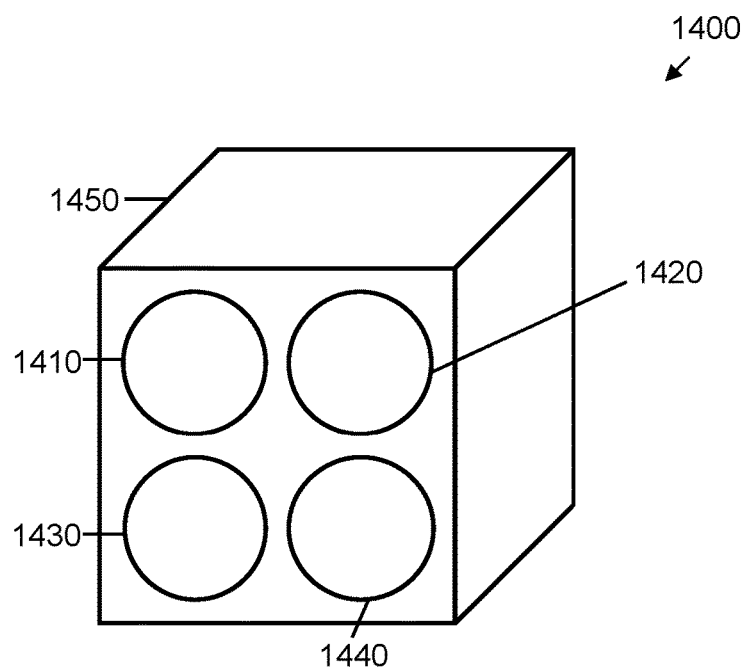
FIG. 14 is a schematic drawing of an MI colorimeter with modular imaging subsystems mounted in a common chassis, according to an embodiment of the present invention.

FIG. 14 shows an example implementation 1400 of at least some of the above embodiments, wherein four modular and interchangeable digital imaging subsystems 1410, 1420, 1430, and 1440 are mounted in a common chassis 1450. In one embodiment the optical axes of the imaging subsystems 1410-1440 are fixed and are parallel to each other. In another embodiment the optical fields of view overlap at the target object plane. In yet another embodiment the imaging optical axes are mechanically adjustable, to vary from a first position in which they are parallel to a second position in which they intersect at the target object plane, as per the first and second embodiments respectively. The optical axes are adjustable to allow variable overlap of the optical fields of view of the imaging subsystems, and the optical fields of view overlap at an object plane corresponding to the captured images. The orientation of the imaging sensors (not shown) within each imaging subsystem may further be optionally adjustable by mechanical means to be perpendicular to their respective optical axes or, as per the third embodiment, angled relative to the target object plane to satisfy the Scheimpflug condition.

C. Image Registration

Figure 15:
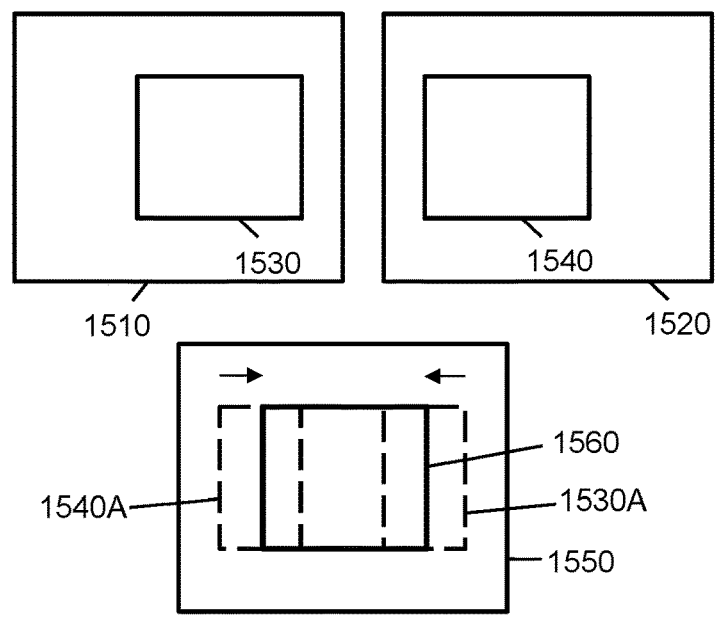
FIG. 15 illustrates image registration for two images captured by one embodiment of the MI colorimeter.

In the first embodiment, shown in FIG. 4, each digital imaging subsystem 410 captures a digital image in which the imaged object may be offset horizontally and/or vertically, i.e. in a direction perpendicular to the respective optical axis. FIG. 15 shows, for example, images 1510 and 1520 captured by two imaging subsystems, with image portions 1530 and 1540 respectively of an LCD panel. These two images 1510, 1520 are composited into a single two-layer image 1550, wherein images 1510 and 1520 are offset horizontally such that they are registered, i.e. the common portions 1530, 1540 of the images are coincident with each other. In the composited image 1550, the image portion 1530 has been shifted to the left from position 1530A, and image portion 1540 has been shifted to the right from position 1540A, such that image portions 1530 and 1540 are coincident and seen as image portion 1560. Not shown in FIG. 15, image registration may also include rotational and magnification transformations. Assuming that the imaging subsystems introduce only sub-pixel geometric distortion, in an ideal case there will be a one-to-one correspondence between the pixels of the two layers of image portion 1560. In practice it may be difficult to register images to within several pixels or less due to focus or resolution limitations, the ability to accurately locate the common portions in the images, and lens distortion among other factors. For the purposes of an MI colorimeter, there must be a minimum of three imaging subsystems, with both horizontal and vertical offsets required to achieve image registration. However, the principle of image registration is the same as described for two underlying images.

Referring again to FIG. 4, in a further embodiment, the digital image sensor 420 of each of the outer imaging subsystems 410A, 410C is offset from its optical axis 450. In this case, image registration may not be required for a predetermined distance between the imaging subsystems 410A-C and a planar target object being imaged.

Figure 16:
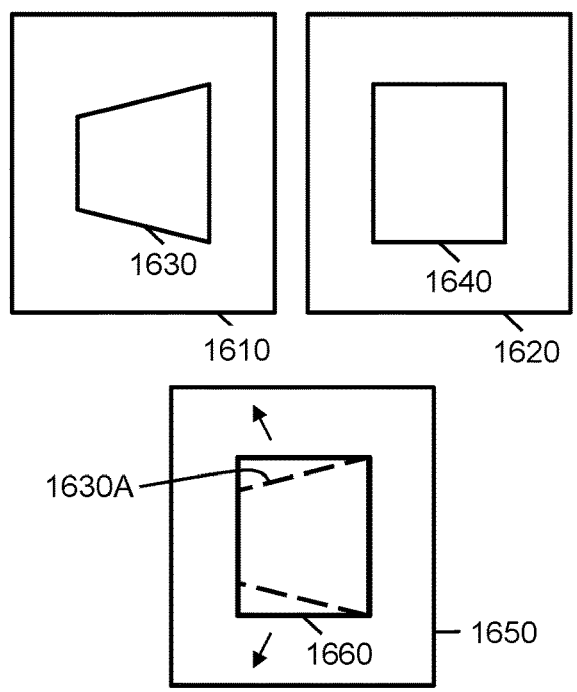
FIG. 16 illustrates image registration for two images captured by another embodiment of the MI colorimeter.

In the second embodiment, shown in FIG. 5, the outer digital imaging subsystems 510A, 510C capture a digital image in which the imaged object located at the common point of focus 560 may exhibit geometric keystoning. FIG. 16 shows, for example, images 1610 and 1620 captured by two imaging subsystems, with image portions 1630 and 1640 respectively of an LCD panel. Image 1620 is produced by an imaging subsystem whose optical axis 550 is perpendicular to the LCD panel, while image 1610 is from an imaging subsystem whose optical axis is oblique to the LCD panel, thus resulting in a keystoned object portion 1630.

These two images are composited into a single two-layer image 1650, i.e. "stacked" to generate a multispectral image. Image 1610 is subjected to a two-dimensional projective mapping projection, in other words a "keystone correction", so that it is registered with image 1620. The resulting image 1650 shows that the image portion 1630 has been differentially stretched vertically from shape 1630A into a rectangular shape that matches image portion 1640 and registered image portion 1660. Assuming that the imaging subsystems introduce only sub-pixel geometric distortion, in an ideal case there will be a one-to-one correspondence between the pixels of the two layers of image portion 1660. In practice it may be difficult to register images to within several pixels or less due to focus or resolution limitations, ability to accurately locate the common portions in the images, and lens distortion among other factors. For the purposes of an MI colorimeter, there must be a minimum of three imaging subsystems, with keystone correction applied to the images as required. However, the principle is the same as described with respect to two underlying images.

The alignment of the images may include translation, rotation, keystone and magnification adjustments to one or more images, so as to register imaged objects in the same location within the multi-layered image. The images are intentionally overlapped to result in a multi-layer registered image that does not cover an area larger than any of the areas from the individual imaging subsystems.

In general, an imaging subsystem whose optical axis is oblique to the plane of the imaged object must be calibrated in order to determine the necessary parameters for keystone correction. For each input image pixel with horizontal and vertical coordinates x, y, the transformation to output image pixel with horizontal and vertical coordinates x', y' is the rational linear mapping:

$$x'=(ax+by+c)/(gx+hy+1), y'=(dx+ey+f)/(gx+hy+1) \quad \text{(Eq. 2)}$$

where a, b, c, d, e, f, g, and h are constants to be determined.

To perform the calibration, four fiducial marks (ideally representing a square) are positioned on the object to be imaged. An image is captured, and the coordinates of the pixels representing four fiducial marks are designated ($x_0$, $y_0$), ($x_1$, $y_1$), ($x_2$, $y_2$), and ($x_3$, $y_3$). As shown by Heckbert, P., 1999, Projective Mappings for Image Warping, University of California Berkeley Computer Science Technical Report 15-869, the above constants are given by:

$$\Delta x_1 = x_1 - x_2, \Delta y_1 = y_1 - y_2 \quad \text{(Eq. 3)}$$

$$\Delta x_2 = x_3 - x_2, \Delta y_2 = y_3 - y_2 \quad \text{(Eq. 4)}$$

$$\Sigma x = x_0 - x_1 + x_2 - x_3, \Sigma_y = y_0 - y_1 + y_2 - y_3 \quad \text{(Eq. 5)}$$

$$g = (\Sigma x \Delta y_2 - \Sigma y \Delta x_2)/(\Delta x_1 \Delta y_2 - \Delta y_1 \Delta x_2) \quad \text{(Eq. 6)}$$

$$h = (\Delta x_1 \Sigma y - \Delta y_1 \Sigma x)/(\Delta x_1 \Delta y_2 - \Delta y_1 \Delta x_2) \quad \text{(Eq. 7)}$$

$$a = x_1 - x_0 + g x_1, d = y_1 - y_0 + g y_1 \quad \text{(Eq. 8)}$$

$$b = x_3 - x_0 + h x_3, e = y_3 - y_0 + h y_3 \quad \text{(Eq. 9)}$$

$$c = x_0, f = y_0 \quad \text{(Eq. 10)}$$

Keystone correction is applied to one or more of the images captured by the second embodiment, shown in FIG. 5. In the third and fourth embodiments shown in FIG. 6 and FIG. 8, keystone correction is unnecessary. However, horizontal and/or vertical offsets may need to be applied to the images to achieve multilayer image registration.

Once the necessary image transformations have been determined through calibration for each imaging subsystem of the multicamera imaging colorimeter, the transformations must be applied to each captured image. Equation 2 is executed in parallel, e.g. using multithreaded operations on a multicore processor, or with a massively-parallel graphics processing unit (GPU).

For some applications, it may be necessary to downscale or upscale one or more images using known image processing techniques. For example, it may be necessary to downscale images in order to achieve image registration with images generated by the image sensor with the lowest resolution, or conversely upscale images to achieve image registration with images generated by the image sensor with the highest resolution.

It may also be an advantage to downscale images by means of pixel binning when performing measurements for chromaticity metrics. For example, the resolution of the human eye is greater for green light than it is for blue light. Consequently, a full resolution image could be used for the CIE Y (luminance) measurements, while pixel binning could be employed to generate reduced resolution images for the CIE X and Z (tristimulus) images. The advantages of such images include lower image storage requirements and increased image transmission and processing speeds, without sacrificing significant chromaticity results.

D. Method

Figure 17:
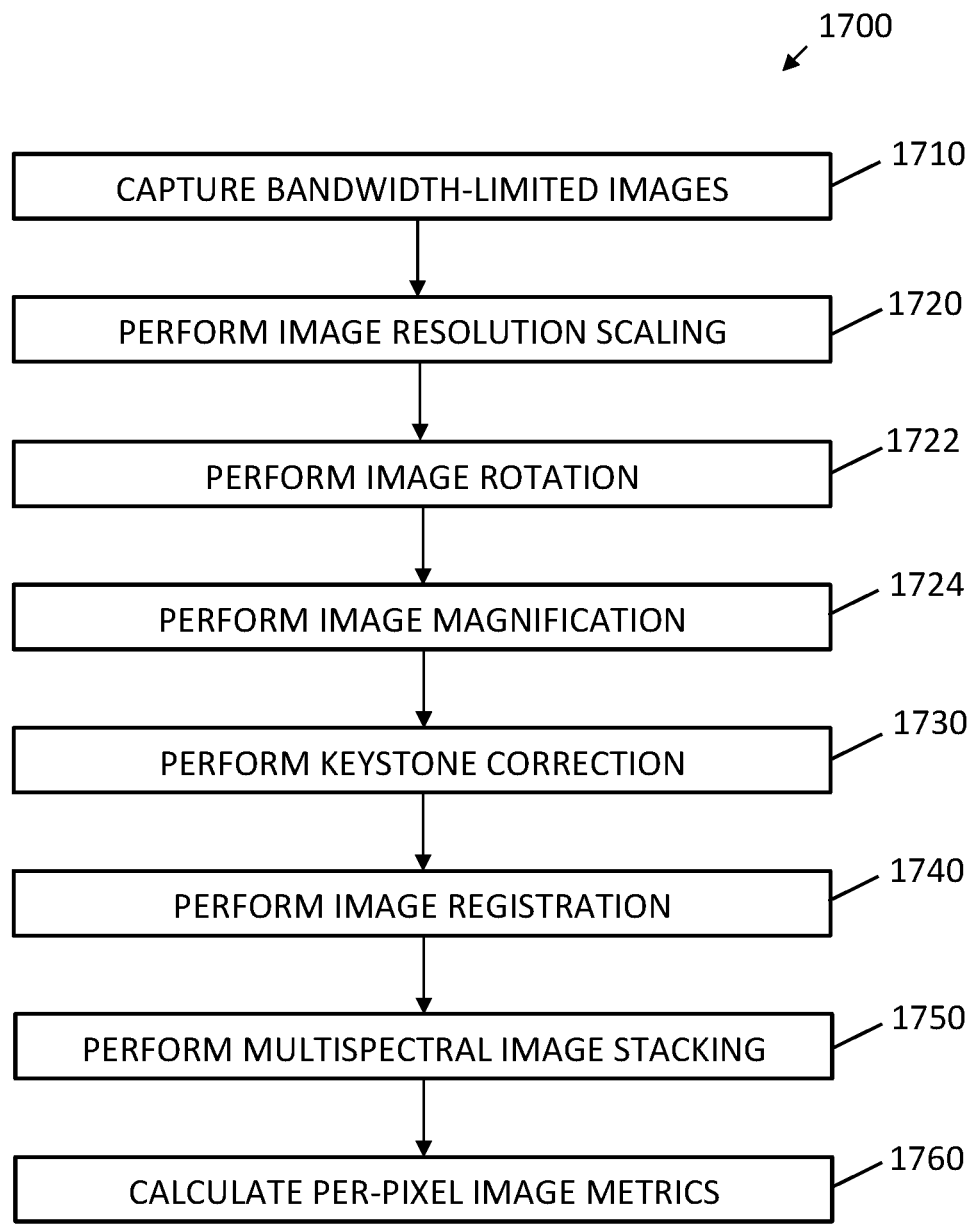
FIG. 17 shows a flowchart illustrating the steps of capturing images and converting them into per-pixel color metrics, according to an embodiment of the present invention.

FIG. 17 illustrates the process 1700 of performing multicamera imaging colorimeter measurements.

In step 1710, the calibrated digital imaging subsystems are used to capture N spectrally-bandwidth-limited images, for example CIE tristimulus images X, Y, and Z.

In step 1720, one or more of the N images may optionally be scaled such that all images have the same horizontal and vertical pixel resolution.

In step 1722, one or more of the images are optionally rotated such that all images have the same angular orientation.

In step 1724, one or more of the images are magnified, such that corresponding features of the images have the same size. Magnification may be positive or negative, i.e. a reduction in size.

In step 1730, keystone correction according to Equation 2 may be applied as required to one or more of the N images in order to facilitate image registration and stacking.

In step 1740, one or more of the N images may be optionally offset vertically and/or horizontally in order to achieve per-pixel alignment of the target portions of the images. For example, the target portion may be the display area of an LCD screen.

In step 1750, the N separate images are combined (or "stacked") into a single multispectral image using a suitable image file format.

In step 1760, per-pixel image metrics are calculated using the multispectral image data.

Steps 1720-1760 are performed by a computer, such as computer 1080 or 1190.

E. Variations

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Two or more steps in the flowcharts may be performed in a different order, other steps may be added, or one or more may be removed without altering the main function of the invention. Electronic modules may be divided into constituent modules or combined into larger modules. All parameters, dimensions, materials, and configurations described herein are examples only and actual choices of such depend on the specific embodiment. Accordingly, the scope of the invention is to be construed in accordance with the substance defined by the following claims.

The invention claimed is:

1. A multicamera imaging system comprising:
multiple imaging subsystems, each imaging subsystem comprising:
 imaging optics aligned on an optical axis;
 an optical filter aligned on the optical axis;
 a digital imaging sensor aligned to capture an image produced by the imaging optics and the optical filter; and
 an analog-to-digital converter connected to an output of the digital imaging sensor; and
a computer connected to the analog-to-digital converters, wherein the computer is configured to:
 align the images captured by the digital imaging sensors to form a multi-layer registered image; and
 calculate illumination metrics of individual pixels of the multi-layer registered image.

2. The system of claim 1, wherein:
there are two identical imaging subsystems;
the optical axes of the imaging subsystems are spaced apart by a human interocular distance;
the optical filter has a spectral transmittance and the digital imaging sensor has a spectral responsivity that when combined approximate the CIE (International Commission on Illumination) 1931 luminous responsivity function $V(\lambda)$; and
the illumination metrics represent a luminance distribution.

3. The system of claim 1, wherein:
there are three imaging subsystems;
the optical filters each have a different spectral transmission function; and
the illumination metrics are photometric, colorimetric or radiometric.

4. The system according to claim 1, wherein the optical filters are mounted in a rotatable disk that is rotatable to move the optical filters from alignment in their respective imaging subsystems to alignment in different ones of the imaging subsystems.

5. The system according to claim 4, comprising a further rotatable disk in which are mounted two or more neutral density filters, wherein the further rotatable disk is rotatable to move the neutral density filters from alignment in a first subset of the imaging subsystems to alignment in a second subset of the imaging subsystems.

6. The system according to claim 1, wherein the digital imaging sensors are configured to simultaneously capture overlapping images of a radiant scene.

7. The system according to claim 1, wherein the optical filters are fixed.

8. The system according to claim 1, further comprising a chassis on which the imaging subsystems are mounted, wherein:
each imaging subsystem has an optical field of view;
the optical axes are adjustable to allow variable overlap of the optical fields of view; and
the optical fields of view of the imaging subsystems overlap at an object plane corresponding to the captured images.

9. The system of claim 8, further comprising:
a range finding device directed at the object plane; and
an autofocus device in each imaging subsystem configured to focus the respective imaging subsystem on the object plane.

10. The system of claim 8, further comprising a spectroradiometer directed at the object plane.

11. The system according to claim 1, wherein each digital imaging sensor is perpendicular to the optical axis of its respective imaging subsystem.

12. The system according to claim 1, wherein each imaging subsystem comprises a transparent optical corrector plate interposed between the imaging optics and the sensor, such that an image of a tilted object plane is in focus on the digital imaging sensor.

13. The system according to claim 1, wherein:
the optical axes are parallel to each other; and
at least one of the digital imaging sensors is centered on the optical axis of the respective imaging subsystem.

14. The system according to claim 13, wherein at least one of the digital imaging sensors is perpendicularly offset from the optical axis of the respective imaging subsystem.

15. The system according to claim 1, wherein the optical fields of view overlap at an object plane corresponding to the captured images.

16. The system according to claim 15, wherein, in at least two of the imaging subsystems, the digital imaging sensor is tilted relative to the corresponding optical axis in order to satisfy the Scheimpflug condition with the object plane.

17. The system of claim 1, wherein each imaging subsystem comprises a shutter aligned on the optical axis.

18. A method to calculate illumination metrics of a radiant scene, comprising the steps of:
simultaneously capturing overlapping digital images of the radiant scene using multiple imaging subsystems of a multicamera imaging system, each imaging subsystem comprising:
imaging optics aligned on an optical axis;
an optical filter aligned on the optical axis;
a digital imaging sensor aligned to capture an image produced by the imaging optics and the optical filter; and
an analog-to-digital converter connected to an output of the digital imaging sensor;
aligning, by a computer connected to the analog-to-digital converters, the digital images to result in a multi-layer registered image; and
calculating, by the computer, illumination metrics of individual pixels of the multi-layer registered image.

19. The method of claim 18, further comprising one or more of:
resolution scaling on at least one of the digital images;
performing a keystone correction on least one of the digital images;
rotating at least one of the images;
magnifying at least one of the images; and
shifting at least one of the digital images in its image plane to register it with another of the digital images.

20. The method of claim 18, wherein:
two digital images are captured;
the optical axes of the imaging subsystems are spaced apart by a human interocular distance; and
the illumination metrics represent a luminance distribution of the radiant scene.

21. The method of claim 18, wherein:
two or more digital images are captured;
the optical axes of the imaging subsystems are spaced or angled apart; and
the illumination metrics represent a luminance distribution of the radiant scene.

22. The method of claim 18, wherein:
three digital images are captured;
the optical filters each have a different spectral transmission function; and
the illumination metrics are colorimetric.

23. The method of claim 18, wherein:
four digital images are captured;
the optical filters each have a different spectral transmission function; and
the illumination metrics are colorimetric.

24. The method of claim 18, wherein:
two or more digital images are captured;
the optical filters each have a different spectral transmission function; and
the illumination metrics are radiometric.

25. The method of claim 18, wherein each imaging subsystem comprises a shutter aligned on the optical axis.

* * * * *